UNITED STATES PATENT OFFICE.

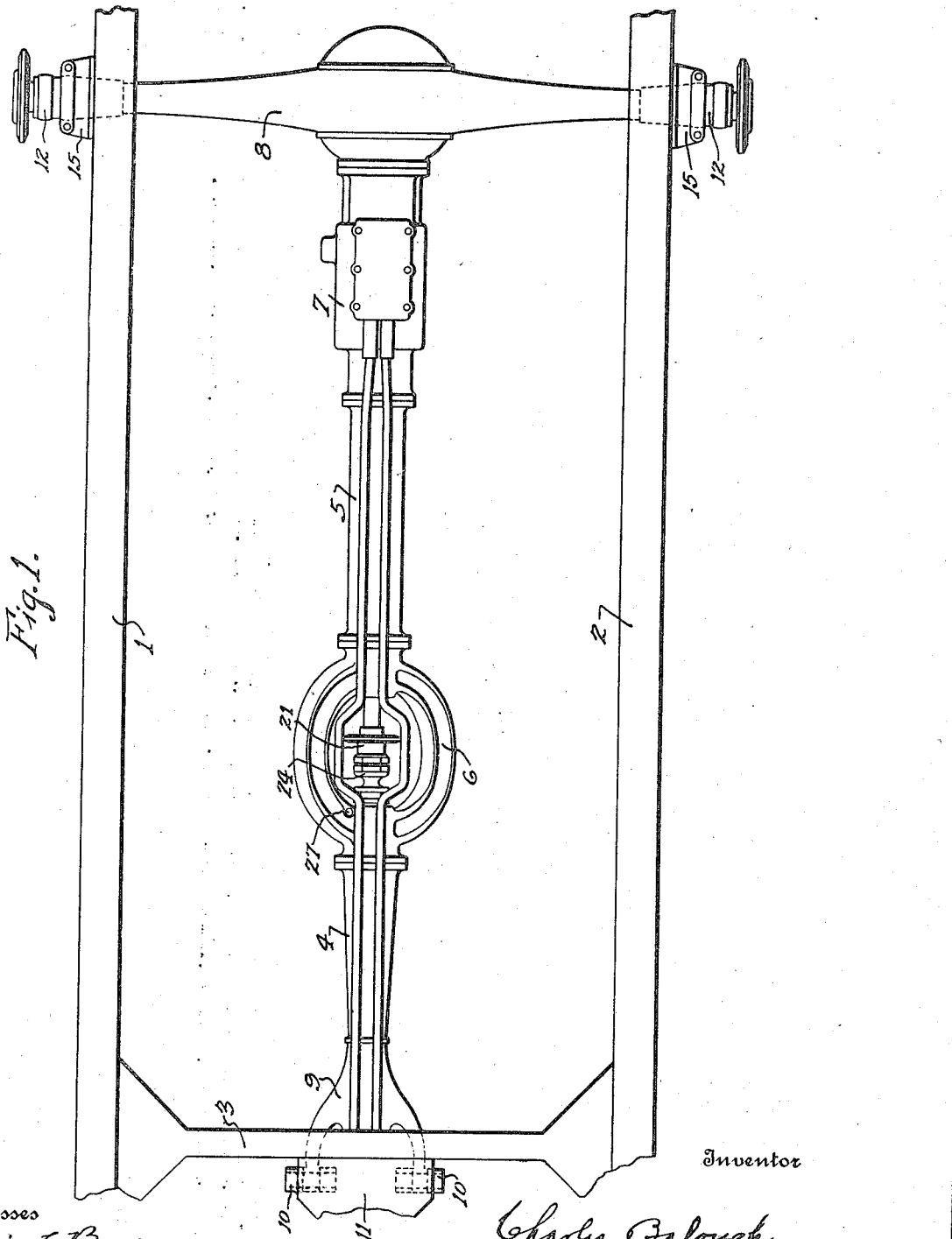

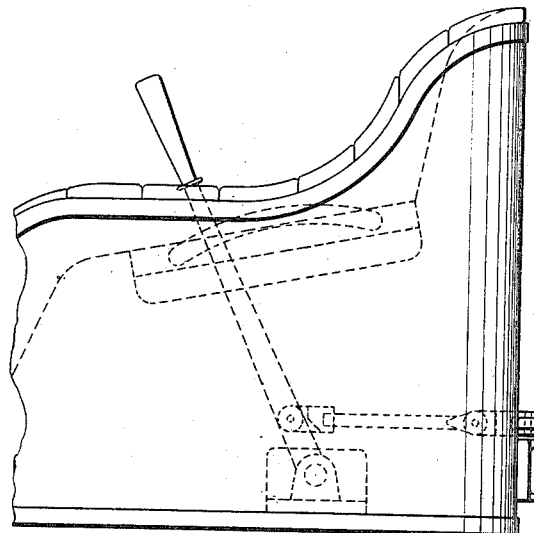
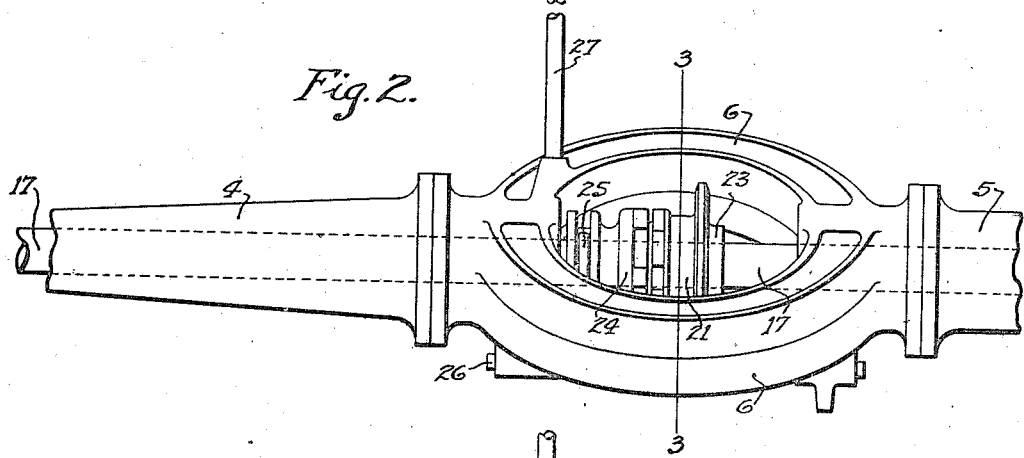
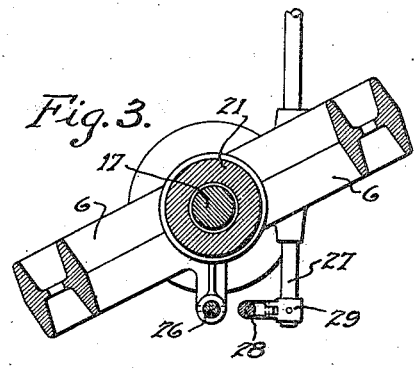

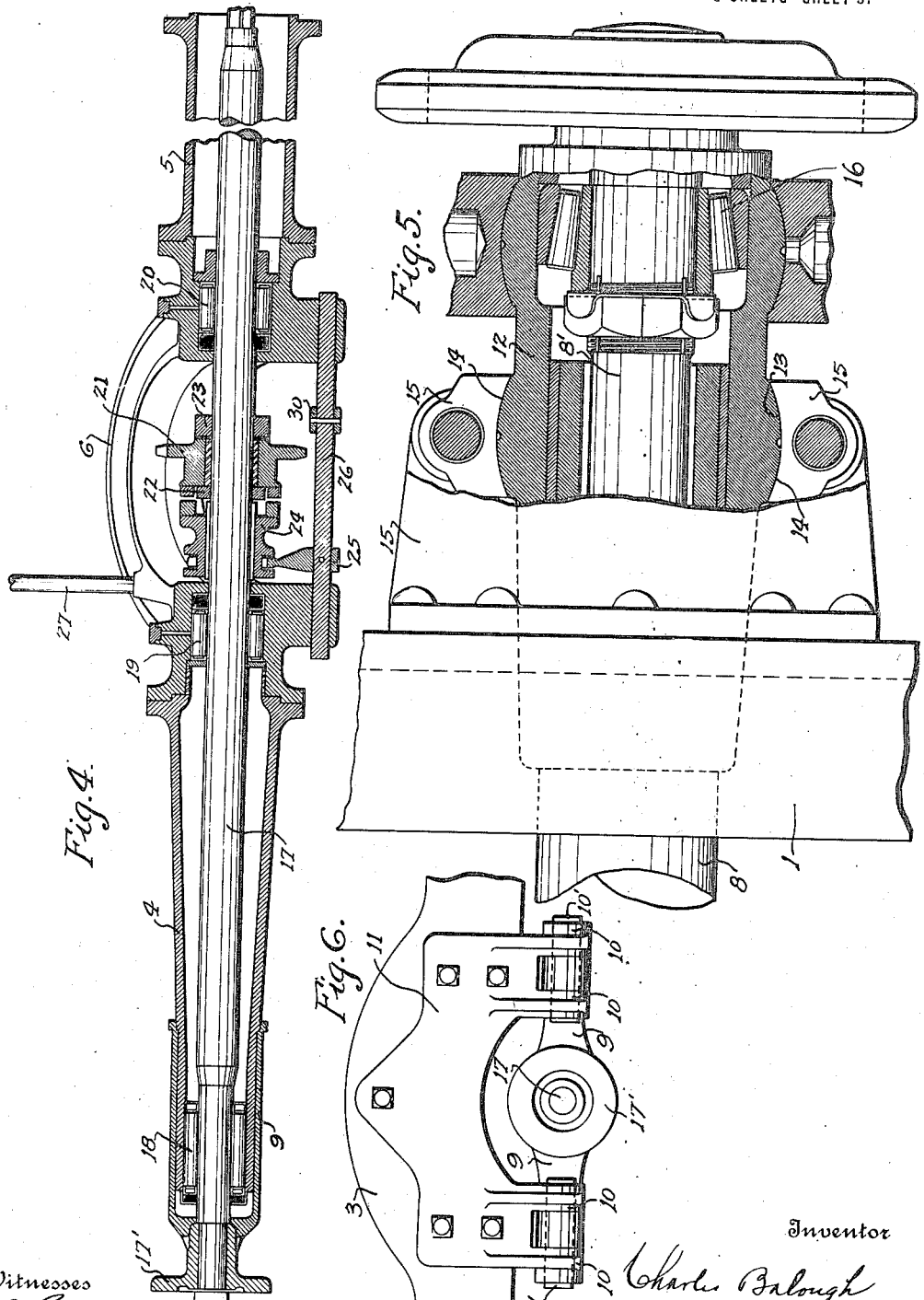

CHARLES BALOUGH, OF SPRINGFIELD, OHIO, ASSIGNOR TO THE KELLY-SPRINGFIELD MOTOR TRUCK COMPANY, OF SPRINGFIELD, OHIO, A CORPORATION OF OHIO.

MOTOR-VEHICLE.

1,186,731.  Specification of Letters Patent.  Patented June 13, 1916.

Application filed March 29, 1915. Serial No. 17,883.

*To all whom it may concern:*

Be it known that I, CHARLES BALOUGH, a subject of the Emperor of Austria-Hungary, residing at Springfield, in the county of Clark and State of Ohio, have invented certain new and useful Improvements in Motor-Vehicles, of which the following is a specification.

This invention relates to improvements in motor vehicles, and particularly to motor vehicles of the truck type.

The invention especially relates to the manner of mounting the driving mechanism of a motor truck, particularly the main drive-shaft, upon the main frame.

In motor trucks, it is often necessary to transmit power to such auxiliary devices as oil-pumps for oil-tanks, water-pumps for water-tanks, dumping devices, air compressors, etc., the power in such cases being taken from the main drive shaft of the vehicle. Heretofore it has been usual to mount the main drive shaft on two universal joints, one at each end, in some cases between the clutch and the front end of the transmission and in other cases between the rear end of transmission and the jack-shaft. This manner of mounting the drive shaft makes a shaft of the floating type so that the elastic distortion and deformation of the frame will be equalized by this floating shaft, but this construction makes it impossible to utilize the drive shaft in a good mechanical manner for the purpose of taking off power for other purposes than that of propelling the vehicle.

The object of this invention is to so mount the driving devices, such as the drive shaft, transmission, differential and jack-shaft, particularly the drive-shaft, in a way that the drive-shaft will be of a non-floating and non-sliding character, and will also be held against vertical or horizontal movement relatively to the main frame, so that power may be derived therefrom in a correct mechanical manner for other purposes than the mere propulsion of the vehicle.

A further object of the invention is to so mount the driving devices that the drive shaft, transmission, differential and jack shaft as well as the controlling devices for certain of the parts will constitute a single rigid unit which will be so disposed on the main frame as to be free from any strains due to the elastic distortion of the frame, so that such rigid unit can be operated without the difficulties encountered by the uneven travel of the vehicle and the chances of cramping of any of its bearings, which would result in a loss of power, or the loss of control of the controlling devices, thereby eliminated.

A further object of the invention is to simplify the construction and make more effective the operation of devices of this character.

In the accompanying drawings—Figure 1 is a top plan view of a portion of the frame of a motor truck showing my improved construction applied thereto. Fig. 2 is a side elevation of a portion of the devices, showing the auxiliary power transmitting mechanism and manner of operating the same. Fig. 3 is a section on the line 3—3 of Fig. 2. Fig. 4 is a longitudinal section through the support for the drive-shaft proper and the auxiliary transmission mechanism. Fig. 5 is a detail showing the manner of flexibly mounting the jack-shaft on the main frame. Fig. 6 is a detail of the forward connection of the drive-shaft support with the main frame.

Like parts are represented by similar characters of reference in the several views.

In the said drawings, 1 and 2 represent, respectively, the side rails of the main frame and 3 the forward cross-bar thereof.

4 and 5 represent sections of a steel tubing connected together by an open saddle 6. The rear end of the section 5 is bolted to the transmission casing 7 and the rear end of the transmission casing is in turn rigidly connected with the jack-shaft and differential casing 8. The rigid structure thus formed is flexibly mounted upon the main frame in the following manner. The forward end of the tube section 4 is swiveled in a forwardly extending yoke 9. The outer ends of the arms of this yoke are pivotally connected by pins 10′ with the ears 10 of a bracket 11 which is secured to the under side of the cross-bar 3, so as to permit the rigid structure described to have a vertically swinging movement relatively to the frame, and also a central torsional movement.

The ends of the jack-shaft casing, or rather the bearing sleeve portions 12 which are secured on the respective ends of said casing, are provided with rounded convex bearing faces 13 fitted to concave bearing faces 14 formed in brackets 15 secured to and depending from the side rails 1 and 2 of the main frame. The respective ends of the jack-shaft 8' are journaled in roller bearings, 16, fitted in the outer ends of each of the bearing sleeves 12, and the main driving shaft, which is represented by 17, is journaled in roller bearings 18, 19, and 20 located respectively at the forward end of the tube section 4 and in the respective ends of the saddle 6, although if desired additional bearings may be employed for this shaft located at convenient points in the structure.

In order that power may be taken from the main drive shaft 17 for the auxiliary purposes heretofore referred to, I provide such shaft at a point within the saddle with a sprocket wheel 21 journaled loosely on said shaft between the collars 22 and 23 and adapted to be driven by the clutch member 24, splined to said shaft and shiftable longitudinally thereon, the hub of said sprocket wheel being provided with clutch faces for engagement with the clutch faces of said member 24. The clutch member 24 is grooved to receive a yoke 25, connected to a rod 26 slidably mounted in the saddle 6. This slidable rod 26 is connected to a vertically extending shaft 27 by a link 28, one end of which is pivotally connected between the ears of a collar 29 secured to the lower end of the shaft 27 and the other end of which is pivotally connected between the ears of a collar 30 secured to said slidable rod 26. The upper end of the shaft extends to a convenient point for the driver so that the clutch may be shifted at will. The forward end of the drive-shaft is coupled by means of the flange 17' to a set of double universal joints (not shown) so as to connect it with the motor.

By the construction described it will be seen that a rigid unit is provided consisting of the tube sections 4 and 5, the connecting saddle 6, transmission casing 7, jack-shaft and differential casing 8 and of the main drive-shaft, transmission gears, differential gears, jack-shaft, and bearings for said parts, together with the controlling devices for the auxiliary driving mechanism, which rigid structure is flexibly supported by the frame at three points.

It will be further seen that such rigid structure is opened up at one point without destroying its rigidity so as to expose the drive-shaft for the purpose of taking therefrom power for auxiliary purposes, and for that purpose there may be applied to said shaft at this point a sprocket wheel such as shown, or if desired a worm gear, beveled gears, or a series of such driving devices, to drive together at the same time or independently of each other, or any other type of transmission devices together with the necessary engaging clutches and controlling devices; it being further noted that by this method of utilizing the main drive-shaft for the transmission of power for auxiliary purposes, all the power available from the motor can be used inasmuch as the drive shaft is always designed to handle all the power generated by the motor.

It will be further seen that the entire driving mechanism from the point of connection of the main drive-shaft with the motor to the point where the jack-shaft transmits its power is a self-contained inclosed unit, so arranged as to be free from such strains as the main frame is subjected to but yet rigid in itself for the purpose of transmitting power to other sources than the propulsion of the vehicle.

Having thus described my invention, I claim—

1. In a motor vehicle, a main supporting frame, a rotatable driving shaft, a jack shaft, a continuous support for said drive shaft and said jack shaft comprising tubular casing sections, a transmission gear casing and differential gear casing all rigidly connected together, including an open saddle rigidly connected therein, means for loosely mounting said continuous support on said frame at its forward end and at two points at the rear thereof, and means on said drive shaft and within said open saddle for connecting said drive shaft for purposes other than the propulsion of the machine, for the purpose specified.

2. In a motor vehicle, a main supporting frame, a rotatable driving shaft, a jack shaft driven thereby, a continuous support for said shafts comprising tubular casing sections, transmission gear casing and differential gear casing, including an open saddle, rigidly connected together, a swiveled connection with said frame at the forward end of said support, sleeve journal bearings between said main support and said continuous support at the rear thereof, and clutch members and gear connections on said driving shaft within said open saddle, for the purpose specified.

In testimony whereof, I have hereunto set my hand this 25th day of March, 1915.

CHARLES BALOUGH.

Witnesses:
CHAS. I. WELCH,
EFFA M. SMITH.